United States Patent
Ribas-Corbera

(10) Patent No.: US 6,535,251 B1
(45) Date of Patent: Mar. 18, 2003

(54) VIDEO ENCODER AND METHOD FOR ADJUSTING QUANTIZATION STEP IN REAL TIME

(75) Inventor: Jordi Ribas-Corbera, Vancouver, WA (US)

(73) Assignee: Sharplabs of America, Inc., Camas, WA (US)

(*) Notice: Subject to any disclaimer, the term of this patent is extended or adjusted under 35 U.S.C. 154(b) by 0 days.

(21) Appl. No.: 09/427,889

(22) Filed: Oct. 26, 1999

(51) Int. Cl.[7] .................................................. H04N 7/18
(52) U.S. Cl. ................................. 348/405; 375/240.03
(58) Field of Search ........................ 375/240.01–240.17

(56) References Cited

U.S. PATENT DOCUMENTS

| | | | |
|---|---|---|---|
| 5,028,999 A | | 7/1991 | Vogel |
| 5,038,209 A | | 8/1991 | Hang |
| 5,159,447 A | | 10/1992 | Haskell et al. |
| 5,426,463 A | | 6/1995 | Reininger et al. |
| 5,479,210 A | | 12/1995 | Cawley et al. |
| 5,543,853 A | | 8/1996 | Haskell et al. |
| 5,612,900 A | | 3/1997 | Azadegan |
| 5,675,384 A | | 10/1997 | Ramamurthy et al. |
| 5,754,236 A | | 5/1998 | Lee |
| 5,764,293 A | | 6/1998 | Uz et al. |
| 5,848,057 A | | 12/1998 | Lee et al. |
| 6,173,012 B1 | * | 1/2001 | Katta et al. ............. 375/240.15 |
| 6,229,849 B1 | * | 5/2001 | Mihara ................... 375/240.05 |

OTHER PUBLICATIONS

"A VBR rate control algorithm for MPEG–2 video coders with perceptually adaptive quantisation and traffic shaping," by Mark R. Pickering et al., Signal Processing: Image Communications 11, 1997, pp. 1–19.

"A Perceptually Efficient VBR Rate Control Algorithm," by Mark R. Pickering et al., IEEE Transactions on Image Processing, vol. 3, No. 5, Sep. 1994, pp. 527–532.

"Lexicographic Bit Allocation for MPEG Video," by Dzung T. Hoang et al., Journal of Visual Communication and Image Representation, vol. 8, No. 4, Article No. VC970376, Dec. 1997, pp. 384–404.

"A Lexicographic Framework for MPEG Rate Control," by Dzung T. Hoang et al., 1997 IEEE Data Compression Conference, 1997, 10 pages.

"VBR Video: Tradeoffs and Potentials," by T.V. Lakshman, et al., Proceedings Of the IEE, vol. 86, No. 5, May 1998; pp. 952–973.

"Jointly Optimal Video Coding and Rate Control for Variable–Bit–Rate Transmission," by David W. Lin, 0–8186–8821–1/98 IEEE, 1998, pp. 939–943.

"Maximally Flat Bandwidth Allocation for Variable Bit Rate Video," by Sanghoon Lee et al., 0–8186–8821–1.98 IEEE, 1998, pp. 346–350.

"Test Model 5, Rate Control and Quantization Contol," printed Aug. 12, 1999 from website:www.mpeg.org/MPEG/MSSG/tm5/, 7 pages.

"1 pass VBR control method for MPEG–2 Video Encoder," by Yutaka Yokoyama et al., 1999 Conference on Electronics, Information, and Communication, 2 pages.

* cited by examiner

*Primary Examiner*—Andy Rao
(74) *Attorney, Agent, or Firm*—Marger Johnson & McCollom, PC

(57) ABSTRACT

A video encoder for encoding a series of groups of frames with an adjustable quantization step, and a method for adjusting the quantization step. The method tracks a complexity parameter of the encoded scenes, and computes a first quantization value in dependence upon the generated complexity parameter. The method further computes a minimum and a maximum step size in dependence upon a number of the bits that have already been generated, and upon the preset target number of bits. The quantization step for the next group of pictures is set in accordance with the first quantization value, but subject to the range defined by the minimum and maximum step sizes. The method further adjusts the minimum and the maximum step sizes.

26 Claims, 8 Drawing Sheets

| QUANTIZER SCALE CODE | LINEAR QUANTIZATION | NON-LINEAR QUANTIZATION |
|---|---|---|
| 1 | 2 | 1 |
| 2 | 4 | 2 |
| 3 | 6 | 3 |
| 4 | 8 | 4 |
| 5 | 10 | 5 |
| 6 | 12 | 6 |
| 7 | 14 | 7 |
| 8 | 16 | 8 |
| 9 | 18 | 10 |
| 10 | 20 | 12 |
| 11 | 22 | 14 |
| 12 | 24 | 16 |
| 13 | 26 | 18 |
| 14 | 28 | 20 |
| 15 | 30 | 22 |
| 16 | 32 | 24 |
| 17 | 34 | 28 |
| 18 | 36 | 32 |
| 19 | 38 | 36 |
| 20 | 40 | 40 |
| 21 | 42 | 44 |
| 22 | 44 | 48 |
| 23 | 46 | 52 |
| 24 | 48 | 56 |
| 25 | 50 | 64 |
| 26 | 52 | 72 |
| 27 | 54 | 80 |
| 28 | 56 | 88 |
| 29 | 58 | 96 |
| 30 | 60 | 104 |
| 31 | 62 | 112 |

FIG.9
(PRIOR ART)

VIDEO ENCODER AND METHOD FOR ADJUSTING QUANTIZATION STEP IN REAL TIME

BACKGROUND OF THE INVENTION

1. Field of the Invention

The present invention is related to the field of coding a digital video signal in bits, and more specifically to coding at variable bit rate and quantization step size in order to achieve compression and high image quality.

2. Description of the Related Art

Encoders that code digital video in bits achieve compression by choosing optimally a parameter called the quantization step size, also known simply as quantization step. The quantization step size is chosen to address the trade-off between a minimum required image quality and a maximum bandwidth for processing and/or transmission of data.

More specifically, using a larger, coarser quantization step size requires fewer bits to store a scene, but decreases image quality. Conversely, using a smaller, finer quantization step size requires more bits to encode the scene, but produces higher image quality. That is because, although the number of pixels is always the same, with a finer quantization the pixel "values" are encoded more accurately. Additionally, for a given quantization step size, the pixel values in simpler scenes are more correlated, and can be described with fewer bits than those in more complex scenes.

There are two main sets of encoding methods in the prior art. The first set of encoding methods, a.k.a. variable bit rate (VBR) mode, is now described with reference to FIGS. 1 and 2. Referring to FIG. 1, the quantization step size is plotted throughout many successive groups of pictures (GOP). (Each "group of pictures" is usually a group of 12–30 successive frames. The step size can generally change at each frame or image block, in which case FIG. 1 would illustrate the average step size per GOP.)

As can be seen, the quantization step size is maintained nearly uniform, which results in uniform image quality. However, the bit rate (seen in FIG. 2) varies according to scene complexity, hence the name variable bit rate (VBR) mode. When the scene is simpler, the bit rate decreases, and when the scene is complex, the bit rate increases.

The VBR mode is useful in asynchronous transmission mode (ATM). There, the next quantization step size is usually computed by tracking and examining slowly moving average statistics about the complexity of the scene in the frames. As such, the quantization step size can not react quickly to flashes or sudden scene changes, in order to prevent the buffer in the encoder from bit overflow. The tracked statistics typically include the produced bit rate, the target average bit rate, the quantization parameters that are used in previous frames, and other related parameters. More advanced methods use histograms of instantaneous bit rate of typical VBR video, and of other statistics.

The VBR mode is most useful for storing compressed video in CD-ROM or DVD. There are many approaches. The most complex ones encode an entire video frame sequence multiple times, each time with different quantization step sizes. Then, after examining the entire recorded sequences, a single set is selected or created, that has optimized the trade-off between the desired image quality and the desired number of bits. These methods are called multiple pass VBR control methods, and are quite effective in maintaining nearly constant quantization throughout the video sequence. However, these methods are not applicable to real-time encoding, since they result in long delays from the high computational complexity, and require extra memory using these delays.

The second set of prior art encoding methods is now described with reference to FIGS. 3 and 4. These methods are called constant bit rate (CBR) mode, and are intended for transmission through channels with fixed bandwidth. As such, they are most useful for real-time encoding. As can be seen in FIG. 3, the bit rate can be maintained nearly constant for many groups of pictures. However, the quantization step size has to keep changing rapidly, and can end up evolving as shown in FIG. 4. Unfortunately, the rapid quantization changes result in annoying fluctuations of the video image quality, which is a major drawback of the CBR mode.

A difficulty in CBR mode encoding is that a decision has to be made on the quantization step size of an upcoming frame without knowing in advance how complex is the scene. An average value is chosen to begin with, and then various algorithms are used to project a useful quantization step size. In fact, the value of the step size is often modified at each image block of a frame in order to further guarantee that the number of bits produced is close to the desired target. These algorithms typically use statistics for the instantaneous complexity of the scene, and are used to project and adapt the step size for the next scene.

BRIEF SUMMARY OF THE INVENTION

The present invention overcomes these problems and limitations of the prior art.

Generally, the present invention provides a video encoder for encoding a series of groups of frames with an adjustable quantization step, and a method for adjusting the quantization step. The method tracks a complexity parameter of the encoded scenes, and computes a first quantization value in dependence upon the generated complexity parameter. The method further computes a minimum and a maximum step size in dependence upon a number of the bits that have already been generated, and with a preset target number of bits. The quantization step for the next group of pictures is set in accordance with the first quantization value, but subject to the range defined by the minimum and maximum step sizes.

The method further adjusts the minimum and the maximum step sizes to achieve fine tuned performance. The foregoing and other features and advantages of the invention will become more readily apparent from the following detailed description of a preferred embodiment which proceeds with reference to the drawings.

BRIEF DESCRIPTION OF THE DRAWINGS

FIG. 9 is a known table showing a relation between quantizer codes and scales for linear and non-linear quantization for MPEG2 type coding.

DETAILED DESCRIPTION OF THE PREFERRED EMBODIMENT(S)

As has been mentioned, the present invention provides a video encoder for encoding a series of groups of frames with an adjustable quantization step, and a method for adjusting the quantization step.

Figure 1:
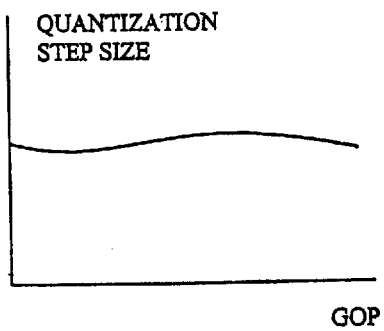
FIG. 1 is a graph of the quantization step size in a first set of encoding methods of the prior art, that controls the quantization step size to be nearly uniform throughout a video sequence.
Figure 2:
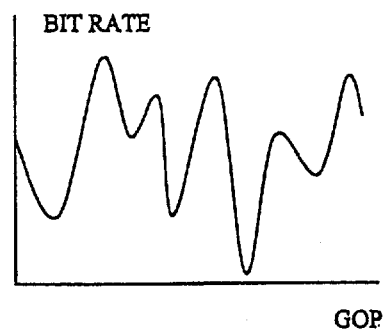
FIG. 2 is a graph of the variable bit rate that results from controlling the quantization step size to be nearly uniform in the first set of encoding methods of FIG. 1.
Figure 3:
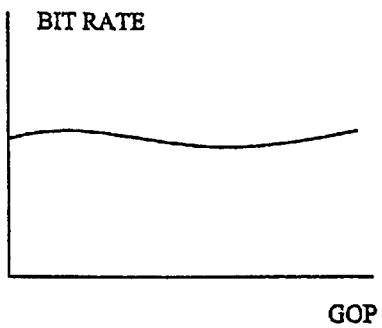
FIG. 3 is a graph of the bit rate in a second set of encoding methods of the prior art, that controls the bit rate to be nearly constant throughout a video sequence.
Figure 4:
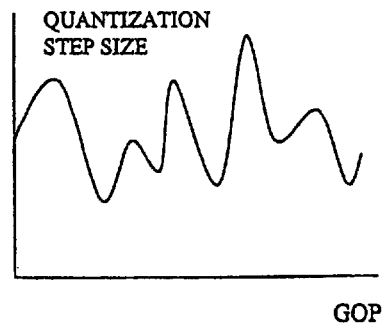
FIG. 4 is a graph of the quantization step size that results from maintaining the bit rate to be nearly constant in the second set of encoding methods of FIG. 3.
Figure 5:
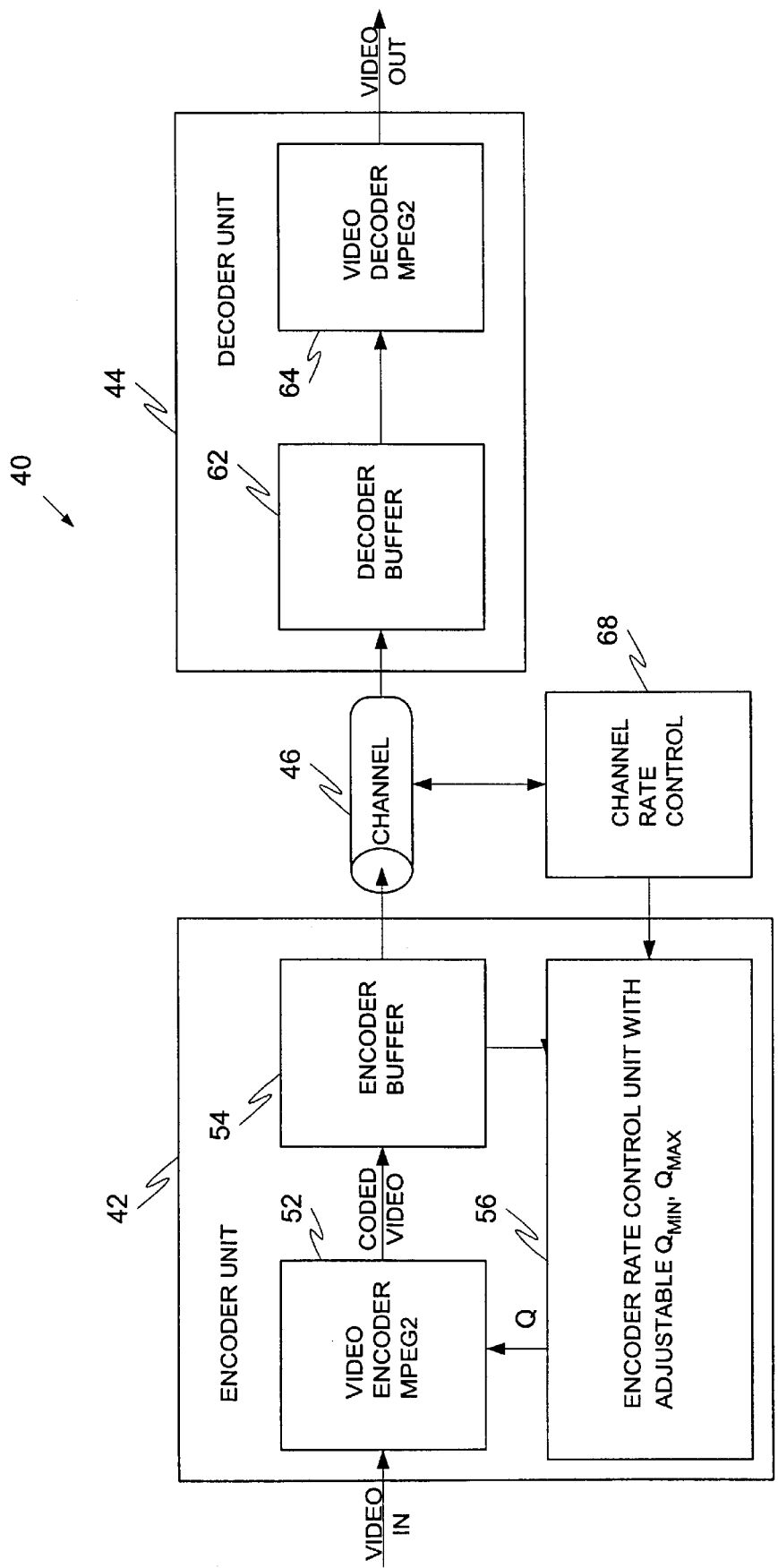
FIG. 5 is a block diagram of a system that embodies the teachings of the present invention.

An exemplary embodiment of the present invention is now described with reference to FIG. 5. A system 40 includes an encoder unit 42 and a decoder unit 44. Unit 42 is coupled with unit 44, optionally through a channel 46, as is known in the art. Depending on the application, the channel can be anything from a long distance transmission to a set of connections within a single apparatus.

Encoder unit 42 includes a video encoder 52, an encoder buffer 54, and an encoder rate control unit 56 that is made according to the present invention. Decoder unit 44 includes a decoder buffer 62, and the video decoder 64. In addition, a channel rate control unit 68 may be provided as is known in the art.

Encoder 52 includes a controllable quantizer for encoding video data according to an adjustable quantization step, thereby generating bits. A video signal VIDEO IN, which is a series of frames arranged in groups, is received by video encoder 52, which can be an MPEG encoder. The encoder also receives data from encoder rate control unit 56 regarding quantization step size. This way unit 56 controls the quantizer by setting the quantization step of the encoding unit at an adjustable value for the frames of each group.

The encoder encodes the video signal according to the received quantization step size, thereby producing a digital signal CODED VIDEO. Signal CODED VIDEO is then input in encoder buffer 54 at the rate that it is being produced by encoder 52.

Data is fed from encoder buffer 54 into channel 46 at a constant or variable rate. The data is then input in decoder buffer 62, and from there into video decoder 64 for final decoding (signal VIDEO OUT).

Control unit 56 can be a chip with programmable software. It can also be implemented in conjunction with unit 52. Unit 56 includes features that can be implemented in software, as will be obvious to a person skilled in the art in view of the present description. Frames in a GOP are coded as I-, P-, or B-type frames. The MPEG standard allows many combinations, but the most used sequence consists of 15 frames in a GOP (group of frames) that follow the pattern:

IBBPBBPBBPBBPBB

Since there are 30 frames per second, there are two GOPs like that per second. The invention works regardless of the sequence selected by the designer.

The first frame is I or intra coded. That means that it is coded by itself, without using any inputs from other frames. There are four P frames in the GOP. The pixel values for a given P frame are predicted from pixels in the previously coded P (or I) frame. Only the prediction error is coded, which typically requires substantially fewer bits than encoding a frame in intra mode. It should be noted that there are two B frames between two P frames (or between the first I and the first P). Each B frame is interpolated from the two closest P (or I) frames.

The features of unit 56 include means for generating a complexity parameter X for a scene from statistics of encoded frames occurring before the selected frame. For example, the complexity of a P frame, XP, is found by multiplying the bits produced by the last encoded frame of type P, $Bits_p$, and the average quantization step size used in the frame, $Q_p$. In other words:

$$XP = Bits_p * Q_p$$

The means for generating the complexity parameter generates complexity parameters XI, XP, XB for Ni I-type frames, Np P-type frames and Nb B-type frames. The means for computing the first quantization value computes the first quantization value. It computes the first quantization value preferably as an average of products Np*XP, Nb*XB and Ni*XI, by ascribing equal weights to product Ni*XI and to product Np*XP, and less weight to product Nb*XB than to product Ni*XI. These features will be better understood in conjunction with the method of the invention that follows.

The features of unit 56 further include means for computing a first quantization value in dependence upon the generated complexity parameter, means for computing a minimum and a maximum step size in dependence upon a number of the bits associated with the frames occurring before the selected frame, and with a preset or predetermined target number of bits. The priorly occurring frames could be in groups occurring before the groups of the selected frame. The target number of bits is determined by the desired video image quality. The features further include means for setting the quantization step in accordance with the first quantization value if the first quantization value is within a range defined by the minimum and maximum step sizes.

Optionally, unit 56 further includes means for decreasing the computed maximum step size if the computed maximum step size exceeds a hard ceiling value, and means for increasing the computed minimum step size, if the computed minimum step size is lower than a hard floor value. The hard ceiling and floor values are preferably fixed.

The method of the invention is now described with reference to flowchart 100 of FIG. 6.

According to step 110, model parameters are considered for the upcoming initialization. The model parameters are made for a model GOP (group of frames or group of pictures), and are carried for all the other groups. The method encodes a GOP with similar quality using a typical video coder such as MPEG2. This can be achieved by encoding all frames with the same quantization step size Q.

The number of bits produced for the frame, Bits, decreases with large values of Q. The following typical model relates Bits and Q:

$$Bits = \frac{X}{Q}, \quad (1)$$

where X is the complexity parameter for the frame, which is different for I, P and B frames. Hence, if $B_{GOP}$ is the total number of bits for a GOP:

$$B_{GOP} = N_I \frac{X_I}{Q} + N_P \frac{X_P}{Q} + N_B \frac{X_B}{Q}, \quad (2)$$

where $N_I$, $N_P$, $N_B$ is the number of I, P, and B frames in the GOP. From Equation (2), Q is isolated to obtain an expression for the value of Q that will encode all the frames in a GOP with $B_{GOP}$ bits:

$$Q = \frac{(N_I X_I + N_P X_P + N_B X_B)}{B_{GOP}} \quad (3)$$

Figure 6:
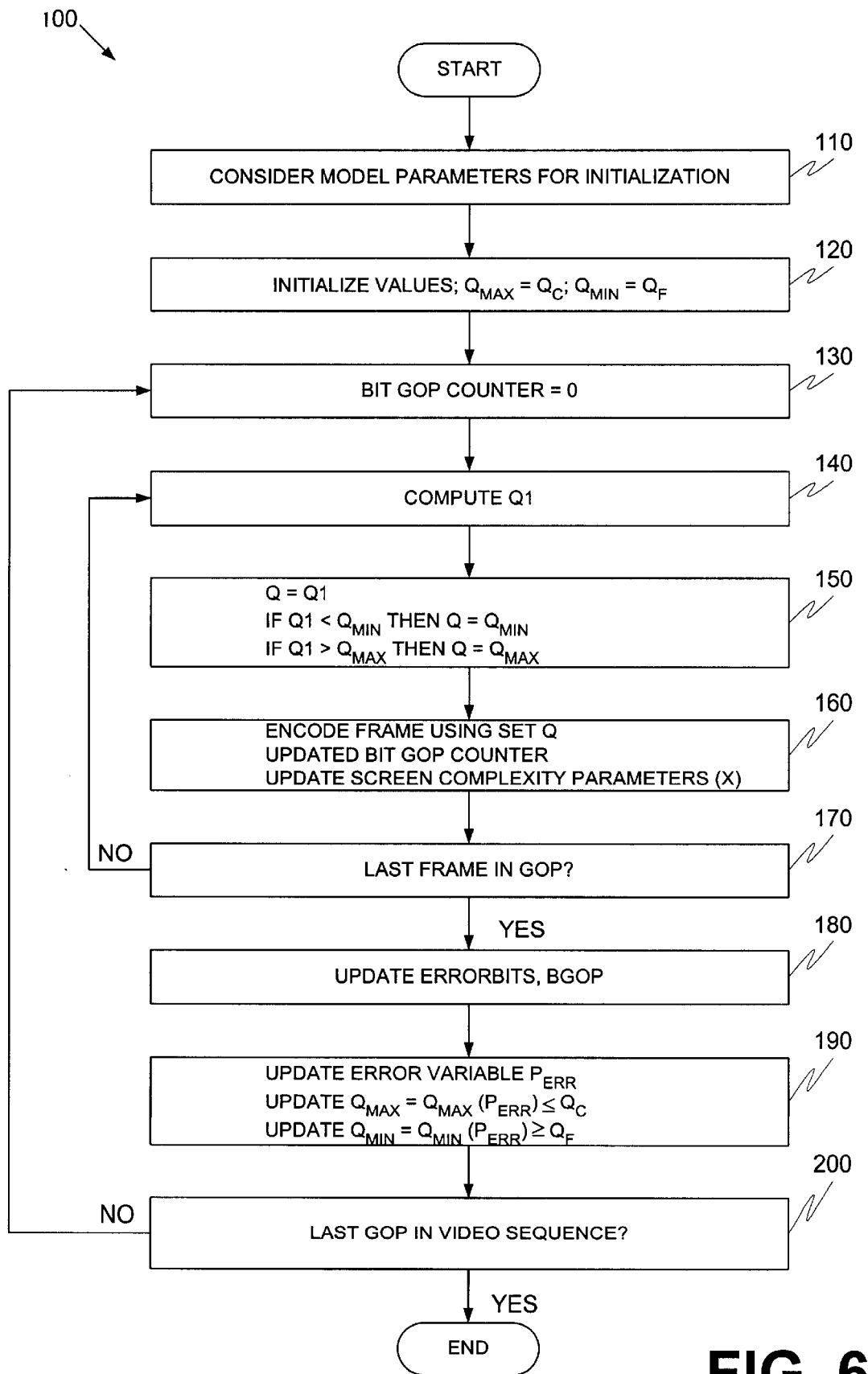
FIG. 6 is a flowchart showing a method according to the invention.

Then, according to step 120 of FIG. 6, values are initialized. In the preferred embodiment they are initialized as follows:

$R_{MAX}$—Maximum bit rate of the channel or storing device.

$R_{AVG}$—Target bit rate (in bits per second) desired on average (must be less than $R_{MAX}$)

F—Frame rate. Typically F=30 frames per second.

N—Number of frames in a GOP, i.e., $N=N_I+N_P+N_B$.

$B_{AVG}$—Average number of bits for GOP, i.e., $B_{AVG}=N \ R_{AVG}/F$.

$B_{MAX}$—Maximum value allowed for $B_{GOP}$. We set $B_{MAX}=1/1.2 \ N \ R_{MAX}/F$.

Speed—Convergence speed to target bit rate.

Bfull—Fullness of the encoder buffer.

Bsize—Size of the encoder buffer.

$ActualB_{GOP}$—Actual number of bits used in GOP.

Errorbits—Error number of bits from average.

In addition, the rate control parameters are initialized as follows:

$B_{GOP}=B_{AVG} \ B_{GOP}$ is initially set to the number of bits for a GOP.

Q=4 is the initial quantization step size or scale (it should depend on $R_{AVG}$).

PrevQ=Q The value of the previous quantization step size is initialized to Q.

$X_I=X_P=X_B=0$ The frame complexities are initialized to zero.

Speed=120 The convergence speed is 120 GOPs.

Bfull=0 The encoder buffer is assumed to be empty at the beginning.

VBVdelay=ffff VBVdelay must be set to this value (in hex.) for MPEG2 VBR video.

$Q_c$=31 defines a hard ceiling for the quantization step size $Q_{MAX}=Q_C$ by default, start at the hard ceiling $Q_F$=1 defines a hard floor for the quantization step size $Q_{MIN}=Q_F$ by default, start at the hard floor Errorbits=0 counter for the group Then a subprocess starts for each group of frames, until all groups in the series are processed. More specifically, according to step 130 of the invention, a counter is initialized for the group:

$ActualB_{GOP}$=0 counter for the group

According to step 140 of the invention, the quantization step size Q for encoding the upcoming frame is selected. This is accomplished by computing a first quantization value Q1. This computation is in dependence upon the generated complexity parameters $X_I$, $X_P$, $X_B$ from previous scenes.

If ($X_I X_P X_B$>0) the first quantization value is computed by Equation (3) as was given above:

$$Q = \frac{(N_I X_I + N_P X_P + N_B X_B)}{B_{GOP}} \quad (3)$$

else Q=PrevQ.

The above formula gives the first quantization value as an average value sum. A preferred method is to alter slightly Equation (3), to take advantage of inter-frame dependencies. This is accomplished by decreasing the importance of the quantization step size of B frames relative to that of I and P frames. This technique improves the video quality because relatively more bits are spent in frames that are used to predict others. In order to keep the visual quality nearly uniform, the step size of the B frames can be increased only up to some point. Specifically, using experiments with human subjects, it was found that when the step size for B frames $Q_B$ is computed by:

$$Q_B = \frac{5}{4} Q,$$

There are no noticeable differences in image quality between B frames and the others. We will then use the formula for $Q_B$ to set the quantization step size for B frames. To incorporate this into the general framework, Equation (3) is modified as follows:

$$Q = \frac{(N_I X_I + N_P X_P + N_B X_B 4/5)}{B_{GOP}} \quad (4)$$

In comparison to Equation (3), $X_B$ is multiplied by 4/5, and the value of Q for I and P frames is made smaller, thus these frames will be encoded with higher quality. Since the B frames will be perceived as having the same quality as the others, the overall video quality will improve.

Then, according to step 150, an adjustment occurs that places Q within the allowable range. In other words, the quantization step is set equal to the first quantization value Q1, computed immediately above, but subject to the condition that the quantization step size be within an allowable range.

The allowable range is between $Q_{MIN}$ and $Q_{MAX}$. It should be remembered that a feature of this invention is that $Q_{MAX}$, $Q_{MIN}$ can be updated by computing. This updating is described with reference to a later step.

So, first set Q=Q1. Then, if Q>$Q_{MAX}$, set Q=$Q_{MAX}$. In other words, if the first quantization value exceeds the computed maximum step size, setting the quantization step size lower than the first quantization value. In addition, it is preferred to set Q=$Q_{MAX}$ only if $B_{GOP}$<$B_{MAX}$.

As a practical matter, the target number of bits for a given GOP, $B_{GOP}$, will be below or above the average $B_{AVG}$. If the encoder has encountered difficult scenes, Errorbits will likely be negative, and $B_{GOP}$ will be lower than $B_{AVG}$. On the other hand, if the previous scenes were easy to encode, Errorbits will be positive and hence $B_{GOP}$ will be larger than $B_{AVG}$. At high bit rates, cases were encountered where Errorbits was so large than $B_{GOP}$ was larger than that allowed by the peak bit rate, and hence this caused the encoder buffer to overflow. In other words, the encoder had saved so many bits that it was spending too many at once. To avoid this, $B_{GOP}$ is limited to be less than or equal to $B_{MAX}$. As such, when $B_{GOP}$ is equal to $B_{MAX}$, it is preferable to not impose the $Q_{MAX}$ limitation on Q. This is because when the produced bit rate is so close to the maximum, adding any upper limit on Q can also easily result in buffer overflow.

Additionally, If Q1<$Q_{MIN}$, set Q=$Q_{MIN}$. In other words, if the first quantization value is lower than the computed minimum step size, the quantization step size is set higher than the first quantization value.

The minimum and maximum step sizes are also known simply as a minimum and a maximum step, respectively.

Then, according to step 160, the frame is encoded using the set quantization step size Q. The quantization step can be computed after every frame, or after every group of frames. Then bit counters are updated, and the scene complexity parameters X are also updated as is known in the art. Let Bits be the number of bits occupied by the current frame.

Actual$B_{GOP}$=Actual$B_{GOP}$+Bits.

Bfull=max(0, Bfull+Bits-$R_{MAX}$/N).

$X_T$=Q·Bits. T is the frame type,i.e.,T is in {I,P,B}.

PrevQ=Q.

According to a subsequent step 170, it is inquired if that were the last frame in the GOP. If not, the process returns to step 140, as above.

Once the last frame of the GOP has been processed, updating takes place as per step 180. Specifically, Errorbits+=$B_{AVG}$–ActUal$B_{GOP}$.

$B_{GOP}$=$B_{AVG}$+Errorbits/Speed . If $B_{GOP}$>$B_{MAX}$, set $B_{GOP}$=$B_{MAX}$.

According to a next step 190 of the invention, a new maximum step size $Q_{MAX}$ is computed in dependence upon a number of the bits associated with the frames of the group, and upon a preset target number of bits. In addition, a minimum step size $Q_{MIN}$ is computed in dependence upon the number of the bits associated with the frames of the group, and upon, the preset target number of bits. These new maximum and minimum step sizes will be used again for processing the frames of the next group, in step 150. Detailed processes for performing this step 190, along with results, are described below.

According to a subsequent step 200, it is inquired if that were the last GOP in the series. If not, the process continues to step 130, as above. Else the process terminates.

Detailed processes are now described for performing this step 190. In general, the computed maximum step size should not be allowed to exceed the precomputed or preset hard ceiling value $Q_C$, which is necessary for some encoding methods, such as MPEG2. Similarly, the computed minimum step size should not be allowed to be below the precomputed or preset hard floor value $Q_F$. As such, if the values for $Q_{MAX}$, $Q_{MIN}$ are computed to be outside that range, the computed values are adjusted accordingly.

Figure 7:
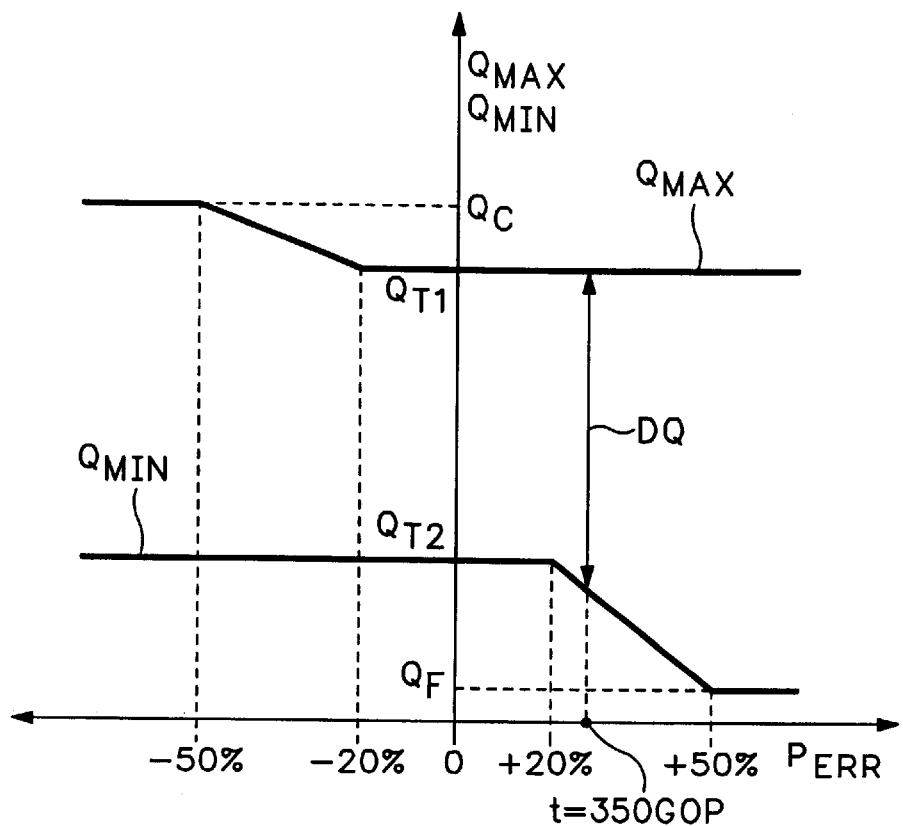
FIG. 7 is a graph illustrating the results of a method according to the invention of controlling adjustable maxima and minima for the quantization step size as a function of an updated error variable.

The preferred method for controlling $Q_{MAX}$, $Q_{MIN}$ now described also with reference to FIG. 7. A usage variable $P_{ERR}$, also known as percentage of error $P_{ERR}$, is defined as follows:

$$P_{ERR} = 100\% \times \frac{Errorbits/Speed}{B_{AVG}} = 100\% \times \frac{B_{GOP} - B_{AVG}}{B_{AVG}} \quad (5)$$

If $P_{ERR}$ is positive, the produced bit rate is lower than the target bit rate. If negative, the rate is higher than the target. In general, and as a matter of good practice, $P_{ERR}$ should not be too far from zero, so that the produced bit rate is reasonably close to the target. Although this is relative to the value of Speed, i.e., the same value of $P_{ERR}$ corresponds to lower Errorbits when Speed is small.

Referring still to FIG. 7, $Q_{MAX}$ and $Q_{MIN}$ are made to depend on $P_{ERR}$. Each dependency accomplishes a different function.

Adjusting the $Q_{MAX}$ according to $P_{ERR}$ accomplishes quality protection. Using empirical experiments with human subjects, a maximum quantization step size threshold $Q_{T1}$ was determined, that ensures good visual quality. It the step size is larger than $Q_{T1}$, compression noise is often visible and annoying. In order to protect image quality, if the produced bit rate is not far from the average (i.e., if $B_{GOP}$ is close to $B_{AVG}$), the maximum quantization step size is set as $Q_{MAX}$=$Q_{T1}$, instead of as equal to $Q_C$. This could be set in the initialization step 120 of FIG. 6 as well.

In practice, using 15–20 percent higher or lower bit rate typically does not produce any noticeable improvements or degradations in visual image quality. This is because the changes in image quality are still within the visual threshold. To take advantage of this property, $Q_{MAX}$=$Q_{T1}$ until the percentage of bit error is within 20 percent, as shown in FIG. 7.

When a video scene is complex, Q will be limited by $Q_{T1}$ for some time, and $P_{ERR}$ will be negative and decreasing. If the scene is long, at some point $Q_{MAX}$ will have to be increased to avoid having a large (negative) bit error $P_{ERR}$. Then Q will likely take values larger than $Q_{T1}$, and compression artifacts will become noticeable. From experience, once compression noise is visible, it does not matter too much whether $Q_{MAX}$ is a little higher or quite higher than $Q_{T1}$, since the user will notice annoying compression noise in both cases.

Adjusting the $Q_{MIN}$ according to $P_{ERR}$ accomplishes Bit rate protection. From experiments with human subjects, it was also observed that when the quantization step size Q is below some threshold $Q_{T2}$, the visual quality is already so good, that decreasing the step size does not produce a significant improvement in visual quality. The invention takes advantage of this property by making the minimum quantization step size $Q_{MIN}$ to be larger than or equal to $Q_{T2}$ for most values of $P_{ERR}$. By keeping the step size above such limit, there is a "saving of bits" from easy video scenes, for future scenes that may need them. As in the previous section, this should be done only when $P_{ERR}$ is small. If $P_{ERR}$ is a positive large number, too many bits will have been saved, and hence $Q_{MIN}$ will need to decrease, as seen in FIG. 7. Again, the hard floor value $Q_F$ should be respected.

As can be seen in FIG. 7, the resulting maximum and minimum step sizes allow a range DQ for the step size. The range changes as $P_{ERR}$ changes.

Figure 8:
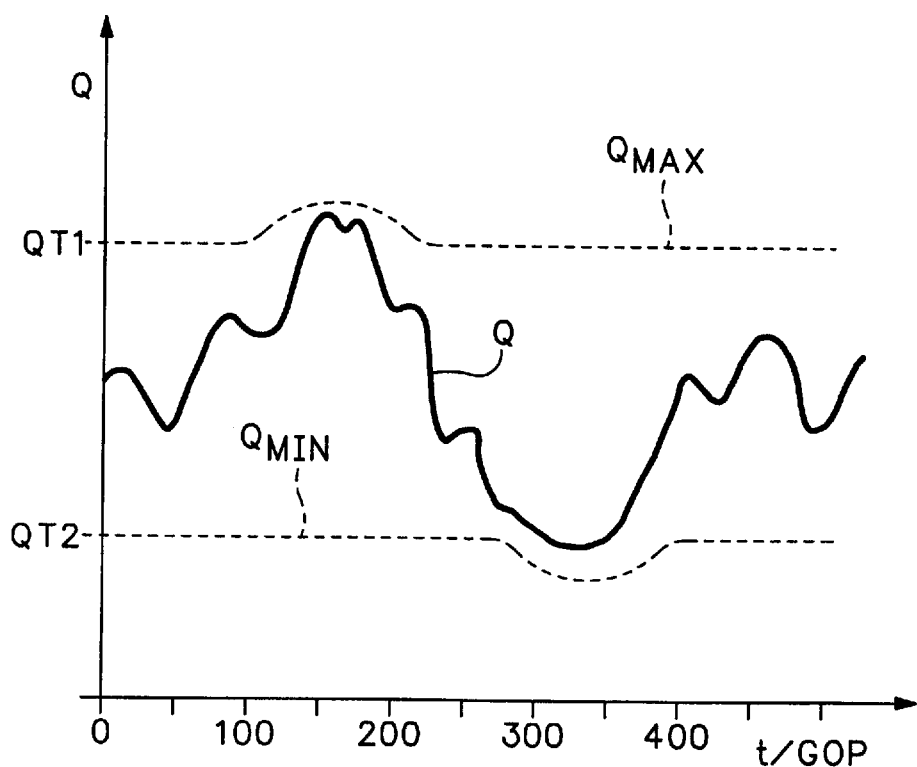
FIG. 8 is a diagram of the quantization step size for a series of GOPs when the maxima and minima are controlled according to the method whose results are shown in the graph of FIG. 7.

Referring to FIG. 8, the resulting algorithm is now discussed. In the horizontal axis there is time, as measured by groups of frames in the sequence. In the vertical axis there is the quantization step size Q that results from the process of the invention. It will be appreciated that Q initially varies between the thresholds QT1 and QT2. However, these thresholds are somewhat flexible and can be moved, as per the discussion associated with FIG. 7. In fact, it will be appreciated how FIGS. 7 and 8 cooperate.

If the value of Speed is small (e.g., 2 or 3), the method above will practically become a CBR rate control technique, because the bit errors in previous GOPs will promptly impact the selection of Q for the frames in the next GOP. But since Speed=120 is large, when the current GOP occupies more bits than the target average $B_{AVG}$, the impact of spending those extra bits will be distributed within the next 120 GOPs. As a result, if there is a scene change or a flash, the method of the invention will not be affected as much. Nevertheless, since $B_{GOP}$ will be fairly close to $B_{AVG}$, the control unit of the invention will still increase or decrease Q rapidly according to scene complexity, because as soon as an I, P, and B frame of a new scene are encoded, the value of Q will be adapted to the new scene conditions.

As will be appreciated from this description, the preferred embodiment of the invention is a VBR method with the capability of reaction of a CBR method. Indeed, the method of the invention selects a quantization step Q using the above described near-CBR method, and limits Q when appropriate to operate in VBR mode. These limits only affect the quality bounds and the average bit rate, but not the method's capability of reaction.

Setting an optimum value for the Speed is also discussed below.

The above illustrate examples of how to adapt the maximum and minimum quantization step sizes $Q_{MAX}$ and $Q_{MIN}$ while encoding for general cases. However, in many encoders (e.g., MPEG2) the step sizes are usually selected indirectly by setting quantization scales, and hence the above should be adapted to such scales, instead of the step sizes. Moreover, these curves should adapt to the different coding conditions such as the average bit rate $R_{AVG}$ and the maximum bit rate $R_{MAX}$. For example, if $R_{MAX}$ is closer to $R_{AVG}$, $Q_{MAX}$ should increase faster to reduce the instantaneous peaks of bit rate.

In MPEG2, the quantization step size for each DCT coefficient is determined by the quantization type, scale, and matrix. For instance, the type of quantization can be either linear or non-linear, and the quantization code determines the quantization scale as shown in Table 300 of FIG. 9.

Figure 10:
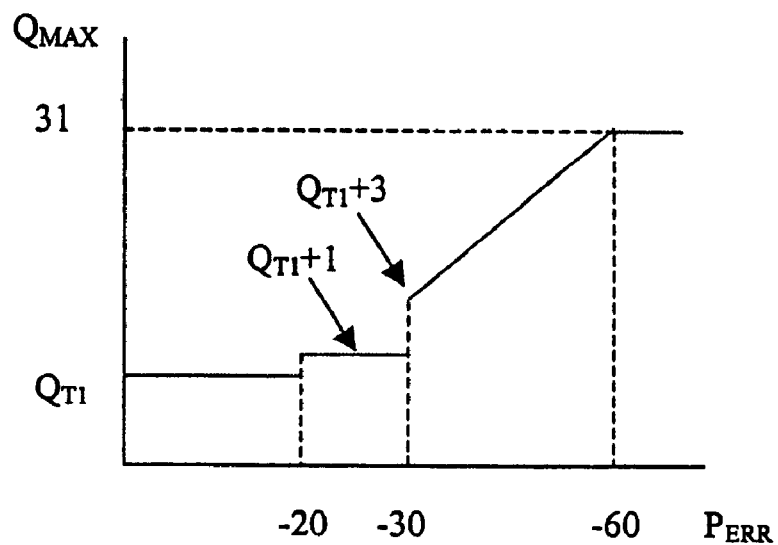
FIG. 10 is a graph showing preferred settings of maximum quantization steps in dependence upon an error variable, for linear or non linear quantization scales in MPEG2.
Figure 11:
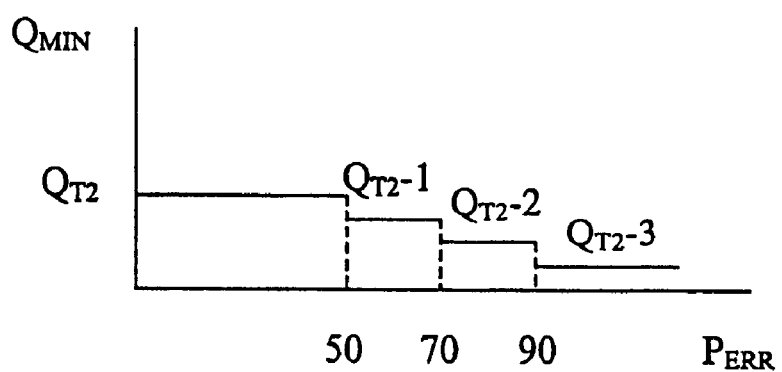
FIG. 11 is a graph showing preferred settings of minimum quantization steps in dependence upon an error variable, for linear quantization scales in MPEG2.

For linear quantization scales in MPEG2, the values for $Q_{MAX}$ are given in FIG. 10, and the values for $Q_{MIN}$ are given in FIG. 11. They are shown as they depend upon the error variable $P_{ERR}$. It can be seen that they are generally similar to the upper left and lower right portions of the graph of FIG. 7 respectively, except that they are particularized for MPEG2 encoding and decoding.

Whenever a rate control strategy limits the maximum value of the quantization step size, there is an increased danger of encoder buffer overflow. To avoid this problem, the encoder of the invention tracks the fullness of the encoder buffer, and makes adjustments when the buffer is nearly full. In another embodiment, the encoder monitors the fullness of the decoder buffer, since the fullness of decoder and encoder buffer are inversely related (e.g., when the encoder buffer overflows, the decoder buffer underflows).

To overcome the problem of encoder buffer overflow, the method of the invention is preferably adapted to react quickly, by increasing quantization whenever the encoder buffer becomes full. One of the key advantages of the invention is that it can so react, because it is a constrained CBR technique. Specifically, when there is danger of buffer overflow, $Q_{MAX}$ can be increased (i.e., relax the constraints), and the method will increase the quantization step size accordingly.

Figure 12:
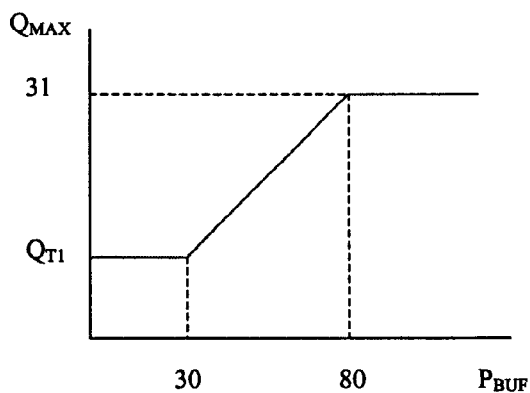
FIG. 12 is a graph showing alternate preferred settings of maximum quantization steps in dependence upon a buffer percentage fullness variable, for linear or non linear quantization scales in MPEG2.

This is implemented as follows: A variable $P_{BUF}$ is defined to be the percentage of fullness in the encoder buffer. A second function is defined for $Q_{MAX}$ as applied to MPEG2 encoding, that is seen in FIG. 12. The second function increases $Q_{MAX}$ according to $P_{BUF}$. In practice, the value of $Q_{MAX}$ can be set to be the largest of the values from FIGS. 10 and 12.

For more safety, one can measure the value of $P_{BUF}$ after each frame is encoded (or even after each macroblock is encoded), and then modify the value of $Q_{MAX}$ according to FIG. 12.

For additional safety, one could also increase $Q_{MIN}$ whenever there is danger of buffer overflow.

Next, the method is adapted to different coding conditions, by adjusting the values of the parameters $Q_{T1}$, $Q_{T2}$, and Speed, in dependence upon the target average bit rate $R_{AVG}$ and the maximum or peak bit rate $R_{MAX}$. These values remain fixed for the entire coding session, since $R_{AVG}$ and $R_{MAX}$ are also fixed.

Figure 13:
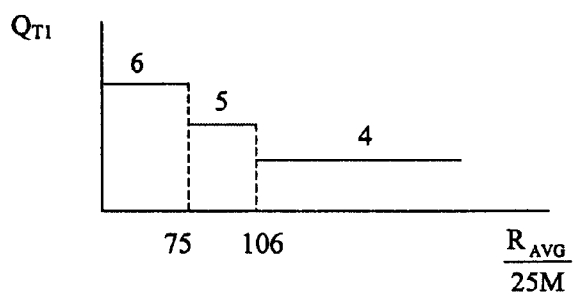
FIG. 13 is a graph showing preferred values for a threshold $Q_{T1}$ of FIG. 12 in terms of an average bit rate and a number of macroblocks in a frame, for non linear quantization scales in MPEG2.

Referring to FIG. 13, setting the value of $Q_{T1}$ is discussed. $Q_{T1}$ is discussed in terms of $R_{AVG}/(25M)$. $R_{AVG}$ is the average bit rate in bits per second and M is the number of macroblocks in a frame. If the video frame rate is 25 frames per second, the fraction $R_{AVG}/(25M)$ is the average number of bits per macroblock. When the video resolution is full-D1, 75 and 106 correspond to 2.5 and 3.5 Megabits per second (Mbps), respectively.

As seen in FIG. 13, it is advantageous to usually set $Q_{T1}=4$. This value was determined empirically by setting the quantization scale fixed to different values, and selecting the maximum scale that produced good visual image quality. At low bit rates $Q_{T1}$ is increased, because then it is very difficult to maintain the quantization scale below 4.

The value of $Q_{T2}$ is preferably set at $Q_{T2}=Q_{T1}-1$. This choice is also based on empirical experiments. Fortuitously, in this linear case the range of quantization scales is only 1. As will be seen below, in non-linear quantization, there are more scales available for the same range, and hence there may have be some additional benefits for bit rate and quality control.

The last setting is that of the Speed variable. It can be either an input that can be adjusted, or set at a value. If set, its repercussions are described also with reference to FIG. 14. It is advantageous to consider the speed in terms of an additional variable P defined as follows:

$$P=10\ R_{MAX}/R_{AVG}$$

Figure 14:
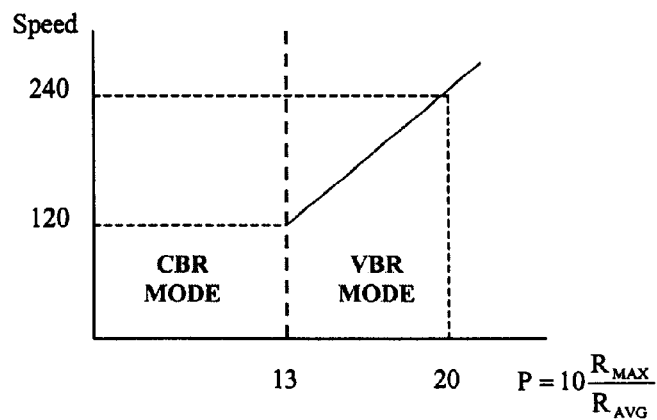
FIG. 14 is a diagram describing an overall behavior of a system of the invention in dependence upon setting a Speed variable.

Setting the Speed will ultimately result in CBR-type operation or VBR type operation, as seen from FIG. 14, which was tuned using empirical experiments. When the maximum bit rate $R_{MAX}$ is close to the average $R_{AVG}$ (i.e., P is closer to 10), the coding conditions become closer to those of CBR video. Hence, when P is closer to 10, it is best to adapt quantization faster, to protect from large instantaneous bit rates and encoder buffer overflow. This is accomplished by reducing the value of Speed for lower values of P, so that $B_{GOP}$ and $P_{ERR}$ are more sensitive to bit rate errors. Since $B_{GOP}$ will vary quickly, the quantization scale Q will adapt faster. Also, the $Q_{MAX}$ and $Q_{MIN}$ constraints will relax, since $P_{ERR}$ will usually fluctuate quickly between large positive and negative values.

From FIG. 14, it is observed that when P is smaller than 13, it can be advantageous to turn off the VBR mode of the encoder, and use true CBR rate control. This is because there is little benefit from using VBR rate control when the maximum and average bit rates are close.

Finally, it is noted that smaller values of Speed will also make the produced bit rate and the target average $R_{AVG}$ closer on average, and hence Speed should be reduced for a more accurate video time length. For example, consider the case that the coded bit stream is being stored on a tape (or disc) of limited capacity. In order to guarantee that the tape will contain a given number of seconds of encoded video, Speed should be gradually reduced at the end of the tape.

Non linear quantization is now described. Non-linear quantization was adopted in MPEG2 in order to allow better quantization control when encoding video at high bit rates. To do this, the non-linear case provides smaller scale increments for the quantization codes between 1 and 8, as shown in Table 300 of FIG. 9. Additionally, non-linear quantization permits very large values of quantization scales, which may be useful when encoding video segments that are hard to compress.

Figure 15:
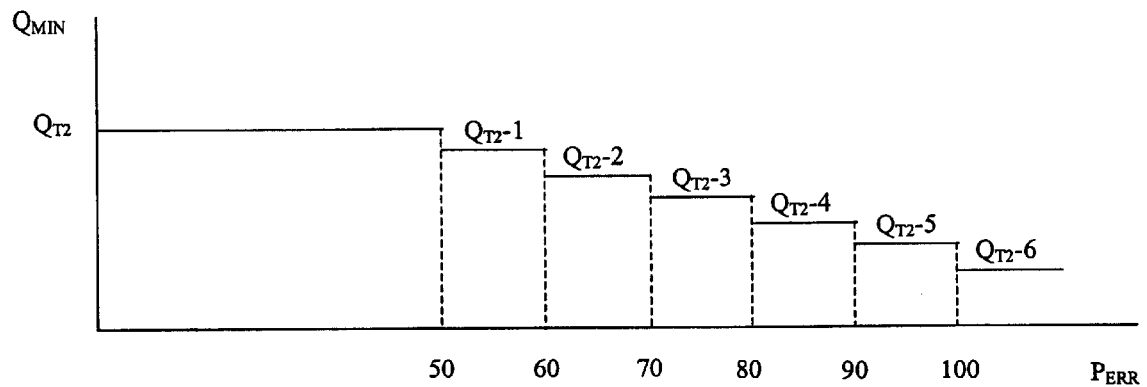
FIG. 15 is a graph showing preferred settings of minimum quantization steps in dependence upon an error variable, for non linear quantization scales in MPEG2.
Figure 16:
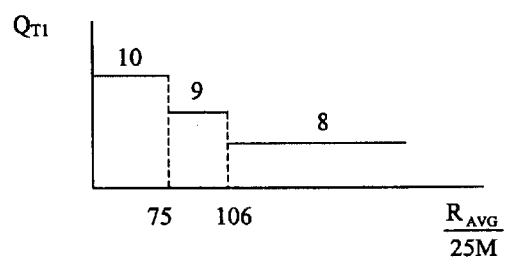
FIG. 16 is a graph showing preferred values for a threshold $Q_{T1}$ of FIG. 15 in terms of an average bit rate a number of macroblocks in a frame, for non linear quantization scales in MPEG2.

It is experimentally found that the data of FIGS. 10, 12 and 14 applies equally well for non linear quantization. However, the data of FIGS. 11 and 13 is best replaced with that of FIGS. 15 and 16 respectively.

Further, for non-linear quantization, it is empirically determined that it is best to set $Q_{T2}=Q_{T1}-2$. Since non-linear quantization provides more scales for the same range, a wider range of quantization scales is available.

The results of tests were positive. When the scale increments are smaller in the non-linear case, the bit rate changes are also smaller, and hence the non-linear buffer does not fill as often. As a result, the chances that buffer overflow will occur are smaller for non-linear quantization.

As per the above, when the buffer is running rather full, e.g. above 30%, the maximum quantization value $Q_{MAX}$ is controlled by the buffer fullness $P_{BUF}$, as shown in FIG. 12. Since $P_{BUF}$ can fluctuate wildly in the VBR case, $Q_{MAX}$ and the quantization parameter Q will also fluctuate significantly from frame to frame. As a result, the video quality will fluctuate significantly as well.

Another embodiment of the invention is now described. The previously described VBR rate control technique is modified so that the quality of the encoded video is always high. This mode of operation is also known as the "quality-guaranteed" mode. For convenience, from now on the previous rate control mode will be referred to as VBR1, and the new (quality-guaranteed) mode as VBR2.

VBR2 is somewhat similar to VBR1, except that in VBR2 the quantization parameter Q is always constrained to be equal or lower than $Q_{MAX}=Q_{T1}$, even when the bit error is large. Consequently, the video image quality will always be good. The $Q_{MAX}=Q_{T1}$ constraint is relaxed when there is danger of buffer overflow, i.e., when the produced bit rate is larger than the peak bit rate. Then, the video quality of the encoded video will degrade. Hence, in order to avoid bad quality video, the peak rate needs to be high enough to permit a quantizer below $Q_{T1}$ for most video scenes.

A disadvantage of the VBR2 mode is that the time or bit error can be very large. In fact, with the VBR2 approach one can only guarantee a minimum time-length of recording time, which is determined by the peak bitrate.

As such, for VBR2 the diagram of FIG. 8 is shaped by the following maximum and minimum constraints:

For minimum, $Q_{MIN}=Q_{T2}$. This saves bits even when the percentage of bit error $P_{ERR}$ is a large positive value. The rationale behind such change is that, since only a minimum recording time can be guaranteed, it may be just as well to save as many bits as possible to have the video recording time as long as possible.

For maximum, $Q_{MAX}=Q_{T1}$. As discussed above, this guarantees that the image quality is good, even when the percentage of bit error $P_{ERR}$ is a large negative value. However, and only when the buffer fills up, $Q_{MAX}$ will increase above $Q_{T1}$ according to FIG. 12, in order to prevent buffer overflow. In other words, the method for setting the quantization step also comprises storing the generated bits in the buffer, and tracking how many bits are stored in the buffer. Then a buffer fullness is monitored as the tracked number of bits stored in the buffer in relation to a preset buffer capacity. The maximum step is computed in dependence upon the buffer fullness. But even that is subject to a preset hard ceiling, as per FIG. 12.

A variation of the VBR2 method is as follows: The value of Errorbits is limited, so that $P_{ERR}$ is never smaller than −30. This is done because $P_{ERR}$ can decrease too much the value of $B_{GOP}$ (which is the target average number of bits for a GOP). Specifically, if $P_{ERR}$ has a very large negative value, $B_{GOP}$ will become quite small, and hence the reaction to The prevent buffer overflow could be too strong, producing unnecessarily high compression noise when the buffer is full.

In the VBR2 method, although the target average bit rate cannot be guaranteed (and that is because Q is constrained to take values between $Q_{T1}$ and $Q_{T2}$), $B_{GOP}$ will affect the "unconstrained" value of Q. As a result, Q will tend to be larger (i.e. closer to $Q_{T1}$) when the target average bit rate is low, and smaller (i.e. closer to $Q_{T2}$) when the target is high. Additionally, the error bits will affect the value of $B_{GOP}$ UP to some point (up until $P_{ERR}$ is no less than −30). Therefore, the desired target average bit rate should be always set as a parameter in the encoder, in order to achieve a bit rate as close as possible to the desired target. More specifically, the average bit rate parameter should either be equal or maybe a little lower than the desired average target, but not larger.

The VBR2 mode was tested with different average and peak bit rates in a wide variety of video scenes. The default average and peak bit rates were set to 4.5 and 9 Mbps, respectively. It was observed that VBR2 encoded the scenes with good image quality, even throughout difficult segments, while preventing buffer overflow.

Yet another optional feature of the invention can ensure that the quality of pictures will not fluctuate quickly. This is implemented by computing a time integral of a buffer fullness indicator $P_{BUF}$, and adjusting the base value $Q_{T1}$ in dependence upon the time integral. In other words, the maximum step size is computed in further dependence upon the time integral of $P_{BUF}$. More particularly, the base value of $Q_{MAX}$ ($Q_{T1}$ in FIG. 7) is increased when $P_{BUF}$ is above 30 percent for too long.

Specifically, the following technique is used before encoding a GOP

1. Set a new variable INC=0. If this is the first GOP, set CPOS=CNEG=0. Otherwise, set CPOS equal to the number of frames in the previous GOP where the buffer fullness was above 30 percent, and set CNEG equal to the number of frames in the previous GOP where the buffer fullness was zero.
2. Increase INC by one unit if CPOS is greater than $\frac{1}{4}^{th}$ of the frames in a GOP.
3. Decrease INC by one unit if CNEG is equal to the number of frames in a GOP.

4. Constrain INC to take values in {0,1,2}.
5. Use $Q_{T1}$+INC instead of $Q_{T1}$ in FIG. 7 (or 10), and also in FIG. 12. Note that the value of $Q_{T2}$ depends only on $Q_{T1}$, and hence $Q_{T2}$ should not change with INC.

A person skilled in the art will be able to practice the present invention in view of the present description, where numerous details have been set forth in order to provide a more thorough understanding of the invention. In other instances, well-known features have not been described in detail in order not to obscure unnecessarily the invention.

While the invention has been disclosed in its preferred form, the specific embodiments thereof as disclosed and illustrated herein are not to be considered in a limiting sense. Indeed, it should be readily apparent to those skilled in the art in view of the present description that the invention can be modified in numerous ways. Applicant regards the subject matter of the invention to include all combinations and sub-combinations of the various elements, features, functions and/or properties disclosed herein. The following claims define certain combinations and subcombinations, which are regarded as novel and non-obvious. Additional claims for other combinations and subcombinations of features, functions, elements and/or properties may be presented in this or a related application for patent. Such additional claims are also regarded as included within the subject matter of applicant's invention irrespectively of whether they are broader, narrower, or equal in scope to the original claims.

The invention claimed is:

1. For use in a video encoding apparatus that receives a series of frames and encodes the frames according to an adjustable quantization step, the video encoding apparatus thereby generating bits associated with the frames, a method for setting the quantization step for encoding a current frame, the method comprising:
    gent rating at least one complexity parameter for at least one encoded frame occurring prior to the current frame in the series;
    computing a first quantization value in dependence upon the generated complexity parameter;
    computing a range of allowable quantization values, the range dependent upon $P_{err}$ a measure of the variation between a preset target number of bits and an actual number of hits encoded; and
    setting the quantization step for the current frame to the first quantization value, constrained by the range of allowable quantization values.

2. The method of claim 1, wherein the frames are arranged in groups, and wherein the quantization step is set once for each group.

3. The method of claim 1, wherein the frames are arranged in groups, further comprising computing the range of allowable quantization values once per group.

4. The method of claim 1, wherein
    the maximum step is computed in further dependence upon a time integral of a buffer fullness indicator.

5. The method of claim 1, wherein:
    the frames are designated as one of I-type, P-type and B-type,
    complexity parameters XI, XP, XB are generated for Ni I-type frames, Np P-type frames and Nb B-type frames, and
    the first quantization value is computed in dependence upon the complexity parameters XI, XP, XB.

6. The method of claim 5, wherein the first quantization value is computed as an average of products Np*XP, Nb*XB and Ni*XI, by ascribing equal weights to product Ni*XI and to product Np*XP, and less weight to product Nb*XB than to product Ni*XI.

7. A video encoder for encoding a series of frames, comprising:
    an encoder unit including a controllable quantizer which encodes video data according to an adjustable quantization step, thereby generating bits; and
    an encoder rate control unit for controlling the quantizer by setting the quantization step of the encoder unit at an adjustable value for encoding a current frame, the control unit including:
    means for generating a complexity parameter for at least one encoded frame occurring prior to the current frame in the series,
    means for computing a first quantization value in dependence upon the generated complexity parameter,
    means for computing a range of allowable quantization values, the range dependent upon $P_{err}$, a measure of the variation between a preset target number of bits and an actual number of bits encoded, and
    means for setting the quantization step in accordance with the first quantization value, constrained by the range of allowable quantization values.

8. The encoder of claim 7, wherein the frames are arranged in groups, and wherein the means for setting the quantization step sets the quantization step once for each group.

9. The method of claim 7, wherein the frames are arranged in groups, wherein the means for computing a range of allowable quantization values computes the range once per group.

10. The video encoder of claim 7, wherein the control unit further includes
    means for computing a time integral of a buffer fullness indicator,
    and wherein the means for computing the maximum step is responsive to the means for computing the time integral.

11. The video encoder of claim 7, wherein
    the frames are designated as one of I-type, P-type and B-type,
    the means for generating the complexity parameter generates complexity parameters XI, XP, XB for Ni I-type frames, Np P-type frames and Nb B-type frames, and
    the means for computing the first quantization value computes the first quantization value in dependence upon the generated XI, XP, XB.

12. The video encoder of claim 11, wherein the means for computing the first quantization value computes the first quantization value as an average of products Np*XP, Nb*XB and Ni*XI, by ascribing equal weights to product Ni*XI and to product Np*XP, and less weight to product Nb*XB than to product Ni*XI.

13. The method of claim 1, wherein $P_{err}$ comprises a fraction of the total difference between the preset target number of bits and the actual number of bits encoded, the fraction scaled by a settable convergence speed parameter Speed.

14. The method of claim 13, wherein Speed depends on a channel overhead measure, the channel overhead measure expressing a ratio between a maximum channel bit rate and in average target bit rate.

15. The method of claim 13, wherein computing a range of allowable quantization values comprises setting the upper end of the range to a first constant that achieves a minimum perceived visual quality, for values of $P_{err}$ above a preset negative threshold.

16. The method of claim 15, wherein for values of $P_{err}$ below the preset negative threshold, computing a range of allowable quantization values comprises increasing the upper end of the range towards a hard ceiling as $P_{err}$ decreases.

17. The method of claim 13, wherein computing a range of allowable quantization values comprises setting the lower end of the range to a second constant that achieves a maximum perceived visual quality, for values of $P_{err}$ below a preset positive threshold.

18. The method of claim 17, wherein for values of $P_{err}$ above the preset positive threshold, computing a range of allowable quantization values comprises decreasing the lower end of the range towards a hard floor as $P_{err}$ increases.

19. The method of claim 1, further comprising:
track sing the used capacity of an encoded bit buffer,
calculating an alternate range of allowable quantization values in dependence upon the tracked capacity of the encoded bit buffer; and
when the alternate range of allowable quantization values is more restrictive than the computed range of allowable quantization values, decreasing the range of allowable quantization values to conform to the alternate range.

20. The encoder of claim 7, wherein the means for computing a range of allowable quantization values calculates $P_{err}$ as a fraction of the total difference between the preset number of bits and the actual number of bits encoded, the fraction scaled by a settable convergence speed parameter Speed.

21. The encoder of claim 20, wherein Speed depends on a channel overhead measure, the channel overhead measure expressing a ratio between a maximum channel bit rate and an average target bit rate.

22. The encoder of claim 20, wherein the means for computing a range of allowable quantization values sets the upper end of the range to a first constant that achieves a minimum perceived visual quality, for values of $P_{err}$ above a preset negative threshold.

23. The encoder of claim 22, wherein the means for computing a range of allowable quantization values increases the upper end of the range towards a hard ceiling as $P_{err}$ decreases, for values of $P_{err}$ below the preset negative threshold.

24. The encoder of claim 20, wherein the means for computing a range of allowable quantization values sets the lower end of the range to a second constant that achieves a maximum perceived visual quality, for values of $P_{err}$ below a preset positive threshold.

25. The encoder of claim 24, wherein the means for computing a range of allowable quantization values decreases the lower end of the range towards a hard floor as $P_{err}$ increases, for values of $P_{err}$ above the preset positive threshold.

26. The encoder of claim 7, further comprising:
means for tracking the used capacity of an encoded bit buffer; and
means for calculating an alternate range of allowable quantization values in dependence upon the tracked capacity of the encoded bit buffer;
wherein the means for computing a range of allowable quantization values decreases the range of allowable quantization values to conform to the alternate range of allowable quantization values, when the alternate range is more restrictive than the computed range.

* * * * *

UNITED STATES PATENT AND TRADEMARK OFFICE
CERTIFICATE OF CORRECTION

PATENT NO.    : 6,535,251 B1  
DATED         : March 18, 2003  
INVENTOR(S)   : Ribas-Corbera It is certified that error appears in the above-identified patent and that said Letters Patent is hereby corrected as shown below:

<u>Column 7,</u>
Line 58, "and upon, the preset" should read -- and upon the preset --.

<u>Column 10,</u>
Line 43, "The value Of QT2" should read -- The value of QT2 --.

<u>Column 12,</u>
Line 24, "reaction to The" should read -- reaction to the --.
Line 34, "value of BGOP UP" should read -- value of BGOP up --.
Line 57, "encoding a GOP" should read -- encoding a GOP: --.

<u>Column 13,</u>
Line 36, "gent rating at least" should read -- generating at least --.
Line 43, "upon Perra measure" should read -- upon Perr, a measure --.
Line 45, "of hits encoded;" should read -- of bits encoded --.

<u>Column 14,</u>
Line 65, "rate and in average" should read -- rate and an average --.
Line 19, "track sing the used capacity of an encoded bit buffer," should read -- tracking the used capacity of an encoded bit buffer; --.

Signed and Sealed this

Eleventh Day of May, 2004

JON W. DUDAS  
*Acting Director of the United States Patent and Trademark Office*